Figure 2A:
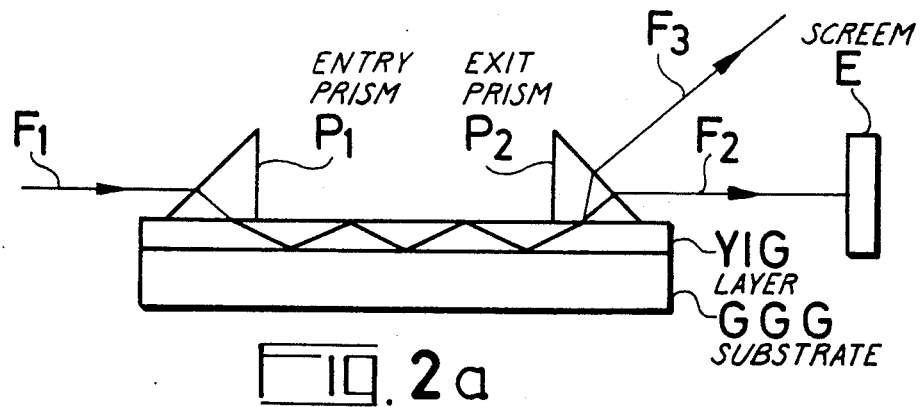
Figure 2B:
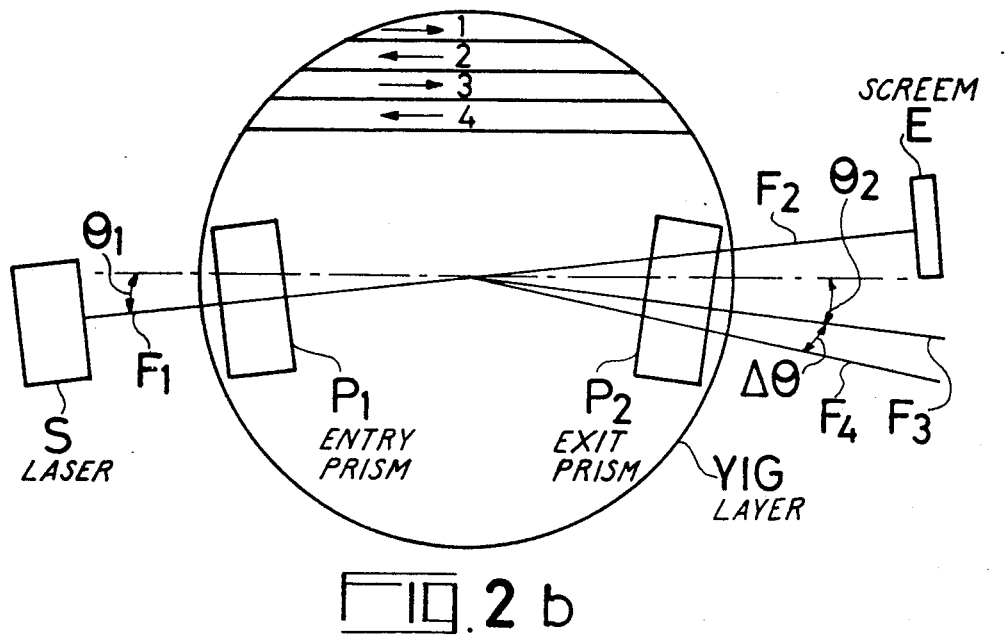

United States Patent [19]

Desormiere et al.

[11] 4,143,939
[45] Mar. 13, 1979

[54] MAGNETO OPTICAL DEFLECTOR

[75] Inventors: Bernard Desormiere; Georges Hepner; Jean-Paul Castera, all of Paris, France

[73] Assignee: Thomson-CSF, Paris, France

[21] Appl. No.: 810,783

[22] Filed: Jun. 28, 1977

[30] Foreign Application Priority Data

Jul. 2, 1976 [FR] France ............... 76 20255

[51] Int. Cl.² .................................. G02B 5/14
[52] U.S. Cl. ............................ 350/96.13; 350/151; 350/355
[58] Field of Search ............. 350/96.13, 151, 355

[56] References Cited

U.S. PATENT DOCUMENTS

| | | | |
|---|---|---|---|
| 3,870,397 | 3/1975 | Dillon, Jr. et al. | 350/96.13 |
| 3,990,776 | 11/1976 | Tseng et al. | 350/96.13 |
| 4,032,216 | 6/1977 | Henry | 350/96.13 |

OTHER PUBLICATIONS

Giess et al., "Magneto-Optical Waveguide", IBM Tech. Disc. Bulletin, vol. 17, No. 9, Feb., 1975.
Henry, "Thin-Film Optical Magnetic Mode Converters", App. Phys. Letts., vol. 26, No. 7, Apr., 1975, pp. 408–411.

Primary Examiner—John K. Corbin
Assistant Examiner—Stewart Levy
Attorney, Agent, or Firm—Cushman, Darby & Cushman

[57] ABSTRACT

The invention concerns the magneto-optical deflectors which enable an incident beam of radiant energy to be deflected in a variable manner under the control of a magnetic field. It consists in using a thin film of a magnetic material forming a diffraction grating, means for travelling the incident beam along the plane of this thin film, and means for magnetically controlling the step-width of the grating, thus controlling the angle of deflection given by this grating.

10 Claims, 3 Drawing Figures

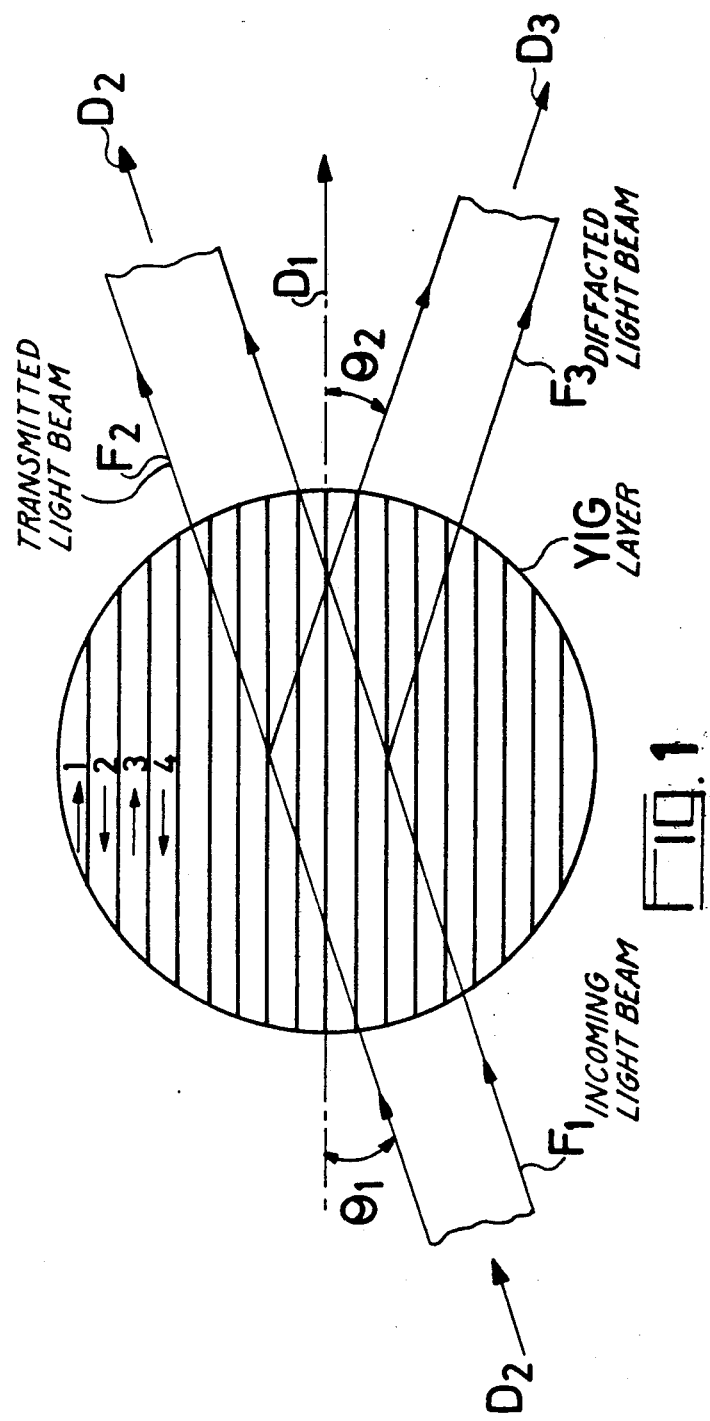

MAGNETO OPTICAL DEFLECTOR

This invention relates to magneto-optical deflectors which enable an incident beam of radiant energy to be deflected in a variable manner under the control of a magnetic field. An apparatus such as this may be used in particular in telecommunications equipment of the type employing optical circuits.

It is known that a thin layer of certain magnetic materials, such as garnets, can be used for forming a diffraction grating capable of deflecting a luminous beam. A thin layer such as this can be magnetised in the form of thin parallel bands of which the magnetisation has a component perpendicular to the layer and alternately differing in direction from one band to the adjacent band. Since the material used has a Faraday effect, this layer behaves like a diffraction grating with respect to a beam of a polarized monochromatic light. A grating of this type is described in particular in French Pat. No. 2,079,014.

This device was subsequently considered for use in the construction of an optical switch, as described in U.S. Patent Application No. 684,383. Unfortunately, the efficiency of a commutator such as this is fairly poor because the light beam is only subjected to the Faraday effect over a short distance (the thickness of the layer) which limits the rotation of the polarisation plane and, hence, the overall efficiency to a low value.

In accordance with the present invention, there is provided a magneto-optical deflector for deflecting an incident light beam having a first direction into at least one emerging beam having a deflected direction slightly variable about a fixed second direction, which comprises:
- a thin layer of alternative bands magnetisable material, said bands extending along a third direction parallel to the layer;
- means for applying to said layer a magnetic field parallel to said third direction; the spacing of the bands being dependent upon the value of said field; and
- means for entering said incident beam into said layer, and means for extracting said emerging beam from the layer.

For a better understanding of the invention, and to show how the same may be carried into effect, reference will be made to the ensuing description and to the attached figures among which:

FIG. 1 illustrates a grating constituted with a magnetic layer and diffracting a light beam;

FIGS. $2_a$ and $2_b$ illustrates respectively a section through and a plan view of a magneto-optical deflector according to the invention.

The inventors have found that a thin layer of a garnet of iron and ytrrium (YIG) substituted for gadolinium and gallium and obtained by epitaxial growth on a substrate which itself consists of a garnet of gadolinium and gallium (GGG) is capable of being self-magnetised in the form of thin, parallel band-like zones of which the magnetisation alternates regularly from one band to the other in the plane of the layer. This phenomenon is particularly clear for a material with the composition $Gd_{0.45} Y_{2.55} Fe_{4.2}Ga_{0.8} O_{12}$.

One such YIG layer magnetised in this way is illustrated in FIG. 1 which shows the direction of the magnetic field in the upper four bands 1 to 4, the alternation continuing for the other bands. These bands are oriented in the direction $D_1$.

A parallel monochromatic light beam $F_1$ is propagated in guided manner in the plane of this layer in a direction $D_2$ which forms an angle $\theta_1$ with $D_1$. This guided propagation is effected in exactly the same way as for hyperfrequency waves in wave guides and the polarisation plane of $F_1$ is fixed in such a way that it is propagated in a transverse electrical mode TE to use the common terminology of wave guides.

The beam $F_1$ is then subjected to a Faraday effect which tends to convert the mode TE into a transverse magnetic mode TM in different directions according to the magnetisation of the traversed band. In the interests of clarity of the Figure, the angle $\theta_1$ has been shown to be large although, in practice, it is very small, being of the order of 1°. As a result and contrary to what is shown in the Figure, the interaction between a ray of the beam and a band is very long, which enables the mode of that ray to assume the TM mode to a very considerable extent. Thus, from one band to the other, the rays of $F_1$ will be propagated in the TM mode with opposite phases due to the different directions of the magnetisations of the adjacent bands.

Under these conditions, the TM mode will fade in the direction $D_2$ and only that fraction of $F_1$ which remains in the TE mode will emerge from the layer in that direction to form the beam $F_2$.

By contrast, the TM mode will form by diffraction in the grating formed by the bands a beam $F_3$ which will emerge from the layer in the direction $D_3$ forming an angle $\theta_2$ with $D_1$. Here once again is the same phenomenon as diffraction of the X rays in the crystals and $\theta_2$ will equal $\theta_1$ providing Braggs' condition $\lambda = 2p \sin \theta$ is fulfilled.

In one practical embodiment, there was used an infrared beam with a wavelength $\lambda$ of 1.15 $\mu$m which lends itself to propagation in materials having the composition defined above, and a film 4.4 $\mu$m thick having periodicity bands P = 25 $\mu$m. The angles $\theta_1$ and $\theta_2$ obtained were indeed equal to the calculated value, i.e., 1.30°, as measured in the atmosphere outside the assembly.

It can be seen that the Figure shows a sudden, very delimited deviation of the beam $F_3$ which does not correspond to the physical phenomenon which is reflected in a curvature distributed over the path in the layer and impossible to represent.

It is necessary to couple the beams used with the thin layer. As shown in FIG. $2_a$, prisms $P_1$ and $P_2$ are used for this purpose, enabling the beams to enter and leave the layer without undergoing total reflection at its outer surface.

Thus, FIG. $2_a$, which is a section through a deflector according to the invention taken along a diameter of the layer YIG parallel to the magnetised bands, shows this same layer YIG supported by a substrate GGG. The beam $F_1$ enters the layer YIG by means of the prism $P_1$, is propagated therein in guided manner by a succession of total reflections at the walls of that layer and undergoes the desired diffraction to form the two beams $F_2$ and $F_3$. Since the reflection angle is very small, the three beams $F_1$, $F_2$ and $F_3$ have been shown for convenience in the same sectional plane.

It is of course possible to separate the two beams $F_2$ and $F_3$ by using the angle formed by the two directons $D_2$ and $D_3$, but since this angle is small it is easier to use an exit prism $P_2$ of bi-refractive material, for example rutile. Since the modes TE (for $F_2$) and TM (for $F_3$) correspond to crossed polarizations of these beams when they enter the prism $P_2$, the prism $P_2$ will deflect them in different ways in the sectional plane. This effect may be very strong and enables an angle of 20° for example to be obtained between the two beams $F_2$ and $F_3$. Thus, it is possible to absorb the undeflected and hence redundant beam $F_2$ by a screen E disposed relatively close to the deflector.

The Bragg conditions prompt the definition, for a given periodicity of the bands and for a given wavelength of the light, of a single, common value (if only one diffraction order at a time, in this case the first, is considered) for the angles $\theta_1$ and $\theta_2$. In fact, since diffraction phenomena are involved it is known that the intensity measured in a direction moving away from the direction $D_3$ does not immediately fall to zero and varies according to a well known curve which has a central peak of which the width at half the intensity is approximately 0.5° under the conditions of the described example.

Conversely, if the spacing of the magnetised bands of the layer YIG are varied and the directions $D_1$ and $D_2$ kept constant, Bragg's conditions are no longer fulfilled, instead a variation is obtained in the direction $D_3$ and hence in the angle $\theta_2$ which can assume a value of approximately 0.5° providing a 50% reduction in the intensity of $F_3$ is accepted. FIG. $2_b$ is a plan view of the structure illustrated in FIG. $2_a$ in which the angles $\theta_1$ and $\theta_2$ have been exaggerated in the interests of clarity of the Figure. In this case, the light beam $F_1$ is emitted by a laser S which is suitably oriented in such a way that the polarization of the beam $F_1$ (lasers generally emit polarized light) enables a propagation in the TE mode to be directly obtained. It would also be possible, in the case of a source of non-polarized light, to use a prism $P_1$ of a bi-refractive material like the prism $P_2$ by orienting the beam $F_1$ relative to that prism in such a way that only one of the rays (for example ordinary) enters the layer YIG, the other undergoing a total reflection at that layer.

The modification of the spacing of the magnetised bands of the layer YIG thus produces a rotation of the beam $F_3$ to obtain, for example, the beam $F_4$ offset by an angle $\Delta\theta$ relative to $F_3$. This angle $\Delta\theta$ has also been exaggerated in FIG. $2_b$.

To obtain a modification of the spacing of the bands, it is possible to apply a magnetic field parallel to the bands and obtained by suitable means (not shown), for example Holmoltz coils. Thus, with the material having the composition defined earlier on, it was possible to obtain a variation in the spacing of the bands from 8 to 30 µm by using an external field varying between 0 and 10 Oe. It is of course only possible to use in this range those values which do not give a deflection beyond the limit determined by the maximum acceptable attenuation for the deflected beam.

In order to obtain a hight efficiency level of this deflector, it is necessary to have a sufficient length of interaction between the prisms $P_1$ and $P_2$. By contrast, it is not necesary to observe the conditions of phase equality between the TE and TM modes because, since the beams in the TE and TM modes separate under the effect of the diffraction, the beam in the TM mode is in no danger of disappearing.

In the context of this example, taking a distance of 1 cm between $P_1$ and $P_2$ and by controlling the external magnetic field to obtain spacing of the bands of 25 µm, an efficiency of 15% was obtained for the beam $F_3$. There is nothing in the phenomenon described to prevent an efficiency of 100% from being obtained and it has been possible to explain this difference between theory and practice by the relative inhomogeneity of the magnetised bands forming the diffraction grating.

What we claim is:

1. A magneto-optical deflector for deflecting an incident light beam having a first direction into at least one emerging beam having a deflected direction slightly variable about a fixed second direction, which comprises:

a thin layer of homogeneous magnetic material having oppositely magnetized stripe domains, said domains extending along a third direction parallel to the layer;

means for applying to said layer a magnetic field parallel to said third direction; the spacing of the domains being dependent upon the value of said field; and means for entering said incident beam into said layer, and means for extracting said emerging beam from the layer.

2. A deflector as claimed in claim 1, wherein said incident beam is a beam of parallel monochromatic light having a first polarization for initially propagating in said layer according to a first pure mode of guided propagation, and said layer is made with Gadolinium and Gallium substituted garnet of Yttrium and Iron; said emerging beam having a second polarization crossed with said first polarization and corresponding to a second pure mode of guided propagation induced by said layer.

3. A deflector as claimed in claim 2, wherein said entering means comprise a bi-refractive entry prism for selecting the polarization of said incident beam.

4. A deflector as claimed in claim 3, wherein the composition of said layer is substantially given by the formula $Gd_{0.45} Y_{2.55} Fe_{4.2} Ga_{0.8} O_{12}$; the layer being deposited onto a substrate made with a Gadolinium and Gallium garnet.

5. A deflector as claimed in claim 4, wherein the thickness of said layer is substantially equal to 4.4 µm.

6. A deflector as claimed in claim 5, wherein said incident beam is an infrared beam having a wavelength substantially equal to 1.15 µm.

7. A deflector as claimed in claim 6, wherein first and second directions are inclined relative to said third direction at angles substantially equal to 1.3°; said angles being measured in the atmosphere outside the layer.

8. A deflector as claimed in claim 3, wherein said extracting means comprise a bi-refractive exit prism for separating from said emerging beam a non deflected beam having said first directions and corresponding to a remainder part of the incident beam being propagated according to said first pure mode.

9. A deflector as claimed in claim 8, further comprising a screen for intercepting said non deflected beam.

10. A deflector as claimed in claim 7, wherein the incident beam propagates into said layer along substantially 1 cm.

* * * * *